United States Patent
Manning

(10) Patent No.: US 7,134,214 B1
(45) Date of Patent: Nov. 14, 2006

(54) ILLUMINATED RULER

(76) Inventor: Stephen R. Manning, P.O. Box 1394, Buda, TX (US) 78610

( * ) Notice: Subject to any disclaimer, the term of this patent is extended or adjusted under 35 U.S.C. 154(b) by 3 days.

(21) Appl. No.: 11/131,365

(22) Filed: May 18, 2005

(51) Int. Cl.
*B43L 7/00* (2006.01)
*F21V 33/00* (2006.01)

(52) U.S. Cl. ........................................ 33/483; 362/577

(58) Field of Classification Search .................. 33/483, 33/484, 485, 492, 493, 348, 348.2; 362/119, 362/551, 555, 577
See application file for complete search history.

(56) References Cited

U.S. PATENT DOCUMENTS

| | | | |
|---|---|---|---|
| 202,545 A | 4/1878 | Holmes | |
| 1,474,804 A | 11/1923 | Tyrrell | |
| 2,992,487 A * | 7/1961 | Miller | ......................... 33/760 |
| 5,243,504 A | 9/1993 | Seizer | |
| 5,519,592 A | 5/1996 | Helms | |
| 5,637,838 A | 6/1997 | Arey et al. | |
| D388,345 S | 12/1997 | Burns | |
| D448,687 S | 10/2001 | Landwerlen | |
| 6,415,521 B1 | 7/2002 | Schnell | |
| 6,615,520 B1 | 9/2003 | Landers, Jr. et al. | |
| 2002/0131275 A1* | 9/2002 | Yamamoto et al. | ......... 362/555 |
| 2004/0130879 A1* | 7/2004 | Choi et al. | ..................... 362/31 |
| 2004/0179372 A1* | 9/2004 | Guerrieri | ..................... 362/555 |
| 2005/0178013 A1* | 8/2005 | Schafer et al. | ................ 33/1 B |
| 2005/0276064 A1* | 12/2005 | Wu et al | ..................... 362/555 |

* cited by examiner

*Primary Examiner*—G. Bradley Bennett
(74) *Attorney, Agent, or Firm*—Stephen R. Greiner

(57) ABSTRACT

An illuminated ruler including a light transmissive bar having opposed ends. An opaque film bearing printed indicia in the form of ruled markings is affixed to the bottom of the light transmissive bar. A light-emitting diode is embedded within the light transmissive bar for illuminating the ruled markings. A battery is carried atop one end of the bar and is connected to the light-emitting diode for energizing and illuminating the light-emitting diode.

7 Claims, 1 Drawing Sheet

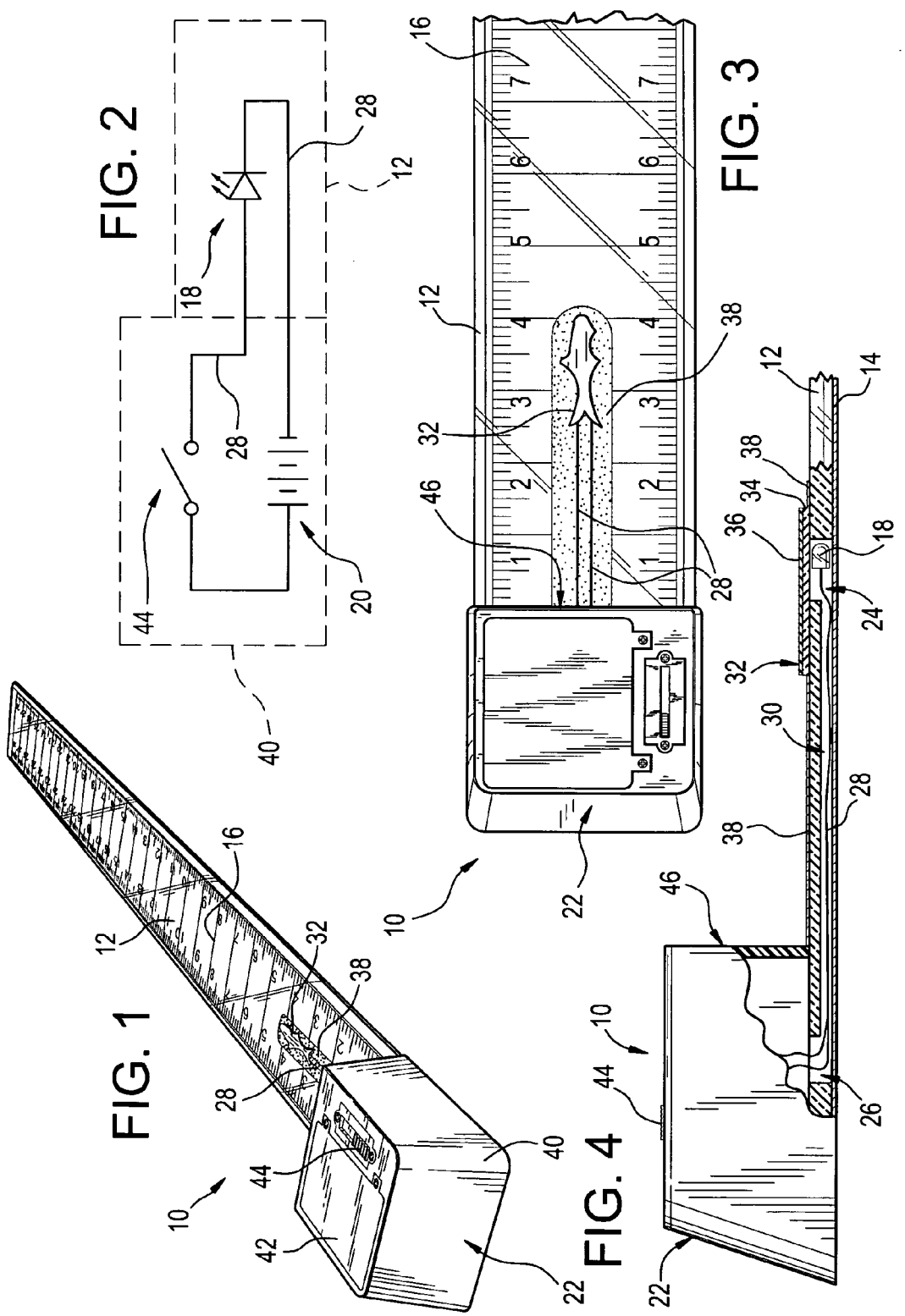

ILLUMINATED RULER

FIELD OF THE INVENTION

The present invention relates generally to geometrical instruments and, more particularly, to anatomical gauges.

BACKGROUND OF THE INVENTION

Measuring a fish caught at night from a small boat has never been easy. The fish itself is slippery and mobile, often requiring two hands to hold. The boat may also be moving, pitching and rolling with the surf. Under such circumstances, it can be nearly impossible to steady a flashlight or lamp adjacent a ruler to get an accurate measurement of the length of the fish. Deciding whether to keep or release a fish caught under such conditions can be a matter of guesswork. Of course, keeping an undersized fish is something that a fisherman does at his own peril, risking: the loss of his fishing license, the confiscation of his fishing gear, and, perhaps, a large fine.

SUMMARY OF THE INVENTION

In light of the problems associated with measuring fish in darkened environments, it is a principal object of the invention to provide a ruler whose ruled markings are brightly illuminated from within the ruler itself. Thus, measurements can be taken in a "hands-free" manner without fumbling with a flashlight and without shadows interfering with the process.

It is another object of the invention to provide an illuminated ruler of the type described that delivers light to the eyes of a user in an indirect manner so as to avoid causing "night blindness."

It is a further object of the invention to provide an illuminated ruler of the type described that requires neither special tools to set up nor prolonged training to learn how to deploy in the field. In fact, the illuminated ruler is intuitive to use.

Still another object of the invention is to provide an illuminated ruler of the type described that assists in the positioning of a fish for rapid and accurate measuring.

It is an object of the invention to provide improved elements and arrangements thereof in an illuminated ruler for the purposes described that is lightweight in construction, inexpensive to manufacture, dependable in use, compact in size, water-resistant, rustproof, self-powered, and portable.

Briefly, the illuminated ruler in accordance with this invention achieves the intended objects by featuring a light transmissive bar having an opaque film, bearing printed indicia in the form of ruled markings, affixed to the bottom thereof. A light-emitting diode is embedded within the bar for illuminating the ruled markings. A box is secured atop one end of the bar, and the box has a wall positioned flush with the first one of the ruled markings so as to serve as a stop for items being measured by the ruler. A battery is positioned within the box and is connected to the light-emitting diode. A switch is secured to the top of the box for selectively opening and closing the connection between the battery and the light-emitting diode.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 1 is a perspective view of an illuminated ruler in accordance with the present invention.

FIG. 2 is a schematic diagram showing the electrical circuit for lighting the illuminated ruler of FIG. 1.

FIG. 3 is a top view of the illuminated ruler with a portion broken away.

FIG. 4 is a side view of the illuminated ruler with portions broken away to reveal interior details thereof.

Similar reference characters denote corresponding features consistently throughout the accompanying drawings.

DETAILED DESCRIPTION OF THE PREFERRED EMBODIMENT

Referring now to the FIGS., an illuminated ruler in accordance with the present invention is shown at 10. Ruler 10 includes a light transmissive bar 12 whose bottom is covered by an opaque film 14 bearing printed indicia in the form of ruled markings 16. A light-emitting diode (LED) 18 is embedded within bar 12 for illuminating ruled markings 16 in the dark. LED 18 is selectively energized by a battery 20 carried in a control pack 22 affixed to one end of bar 12.

Bar 12 is formed of a transparent plastic material that is stiff and scratch-resistant. As shown, bar 12 is about 22 inches (56 cm) in length, 3 inches (7.6 cm) in width, and 0.25 inches (0.64 cm) in thickness to be suitable for use in measuring freshwater game fish. Nonetheless, these dimensions are a matter of design choice and can be enlarged or reduced as a user may desire.

Film 14 is formed of an opaque plastic material and is affixed by means of a suitable adhesive to the bottom of bar 12. Ruled markings 16 are printed atop film 14 and are easily seen through the thickness of bar 12. Ruled markings 16 are provided every ⅛ of an inch (0.32 cm) with every eighth marking being boldly delineated and numbered from 1 to 18 along the length of film 14 to designate inches for measuring purposes. Of course, markings 16 can be spaced, numbered, and delineated in any suitable manner.

A pair of spaced-apart holes 24 and 26 penetrates bar 12. One of these holes 24 extends through bar 12 about 3.5 inches (8.9 cm) from control pack 22 for receiving LED 18. The other of these holes 26 extends through bar 12 beneath control pack 22 through which a pair of electrical leads 28 is extended from battery 20. A channel 30 stretches along the bottom of bar 12 and connects holes 24 and 26 to permit the passage of electrical leads 28 from battery 20 to LED 18 wholly within bar 12. Since film 14 covers the bottom of holes 24 and 26 and channel 30, LED 18 and leads 28 are isolated from the environment from below.

A light reflector 32 is affixed by a suitable adhesive atop bar 12 to cover hole 24 and LED 18 therein. Reflector 32 is a light transmissive plate 34 formed of plastic that has an opaque, light-reflective coating 36 upon its top. During use of ruler 10, reflector 32 reflects most light traveling upwardly from LED 18 back into bar 12. Some of this light, however, is permitted to radiate from the sides of reflector 32 thereby permitting a fisherman to determine at a glance which end of ruler 10 measurements should be taken from. Reflector 32 can be cut with a distinctive outline, like the shark illustrated, to serve as a trademark.

When LED 18 is illuminated, the sides of channel 30 and hole 24 undesirably direct light upwardly through bar 12 making these areas somewhat more luminous than surrounding areas. To even out the luminosity of bar 12, a strip of translucent film 38 is affixed atop bar 12 by means of a suitable adhesive to cover channel 30 and surround hole 24 so as to defuse light radiating from bar 12 adjacent channel 30 and hole 24. As shown, strip 38 extends from control pack 22 down the center of bar 12 to a point just beyond reflector 32. Strip 38 has a width of about 0.75 inches (1.9 cm) and a thickness of a few thousandths of an inch.

LED 18 emits light of a desired color, such as white, when energized by a direct electrical current. LED 18 provides high-intensity light but produces little heat. If desired, however, an incandescent or fluorescent bulb capable of operating at a low voltage can be substituted for LED 18.

Control pack 22 includes a water-resistant, plastic box 40 that is about 3 inches (7.6 cm) long, 3 inches (7.6 cm) wide, and 1.5 inches (3.8 cm) tall. Positioned within box 40 behind a removable door 42 is a battery (or array of batteries) 20 capable of producing an electrical current of adequate voltage and amperage to energize and illuminate LED 18. The poles of battery 20 are connected through paired leads 28 to LED 18. A switch 44 is provided on one of leads 28 for selectively opening and closing the circuit between battery 20 and LED 18. Switch 44 is preferably water-resistant and of slide-type, capable of being toggled between opened and closed positions and is mounted upon the top of box 40 for easy access.

The side wall 46 of box 40 facing bar 12 serves as a stop from which game fish can be easily measured. As shown, side wall 46 is positioned flush with the first of markings 16. Side wall 46 also extends upwardly at right angles from bar 12 assuring an accurate measurement regardless of the thickness of the fish pressed against it being measured.

Use of illuminated ruler 10 by a fisherman is straightforward. First, ruler 10 is laid flat upon the deck of a boat or other convenient, horizontal, supporting surface. Then, assuming that it is dark, switch 44 is slid to the "on" position to close the circuit between battery 20 and LED 18 thereby illuminating LED 18. With LED 18 being illuminated, light therefrom travels throughout bar 12 and reflects from film 14 and elsewhere making ruled markings 16 and the periphery of reflector 32 readily visible. Now, the "nose" of a fish is touched to side wall 46 with the tail of the fish extending down bar 12 and the length of the fish is read from ruler 10 with reference to markings 16. Finally, an undersized fish is returned to the water whereas a larger fish may be harvested. The entire process of measuring a fish under darkened conditions requires just seconds to complete and requires no fumbling with flashlights or lamps.

When fishing is done, LED 18 is deenergized by sliding switch 44 to the "off" position, opening the circuit between battery 20 and LED 18. Next, bar 12 is wiped clean or rinsed and stowed in a convenient location. Illuminated ruler 10 is now ready for immediate reuse.

Should the light emitted by LED 18 dim, battery 20 is easily replaced by temporarily removing door 42 from the top of box 40, sliding battery 20 from clips (not shown) holding such in place, substituting a new battery 20 for the old one, and replacing door. By replacing battery 20 from time to time as it becomes depleted, the operating life of illuminated ruler 10 can be extended almost indefinitely.

While the invention has been described with a high degree of particularity, it will be appreciated by those skilled in the art that modifications may be made thereto. For example, several LEDs can be used in place of one to illuminate ruler 10 and their locations in bar 12 can be modified to achieve optimum illumination. Therefore, it is to be understood that the present invention is not limited to the sole embodiment described above, but encompasses any and all embodiments within the scope of the following claims.

I claim:

1. An illuminated ruler, comprising:
    a light transmissive bar having opposed ends;
    an opaque film bearing printed indicia in the form of ruled markings being affixed to the bottom of said light transmissive bar;
    a light-emitting diode being embedded within said bar for illuminating said ruled markings;
    a battery being carried atop one end of said bar and being connected to said light-emitting diode for energizing said light-emitting diode.

2. The illuminated ruler according to claim 1 further comprising a reflector being affixed to said bar atop said light-emitting diode for reflecting light traveling upwardly from said light-emitting diode downwardly and back into said bar.

3. The illuminated ruler according to claim 2 wherein said reflector comprises:
    a light transmissive plate being positioned adjacent said bar; and,
    a light-reflective coating being positioned atop said light transmissive plate.

4. The illuminated ruler according to claim 1 further comprising a water-resistant box being secured atop one end of said bar for containing said battery, and said box having a side wall being positioned flush with the first of said ruled markings so as to serve as a stop for items being measured by said ruler.

5. The illuminated ruler according to claim 4 further comprising a switch secured to the top of said box for selectively opening and closing the electrical connection between said battery and said light-emitting diode.

6. An illuminated ruler, comprising:
    a light transmissive bar having opposed ends, the bottom of said bar bearing indicia in the form of ruled markings;
    a light-emitting diode being embedded within said bar for illuminating said ruled markings;
    a box being secured atop one end of said bar, and said box having a wall being positioned flush with one of said ruled markings so as to serve as a stop for items being measured by said ruler; and,
    a battery being positioned within said box and being connected to said light-emitting diode for energizing said light-emitting diode.

7. An illuminated ruler, comprising:
    a light transmissive bar having opposed ends;
    an opaque film bearing printed indicia in the form of ruled markings being affixed to the bottom of said light transmissive bar;
    a light-emitting diode being embedded within said bar remote from said opposed ends thereof for illuminating said ruled markings;
    a box being secured atop one end of said bar, and said box having a wall being positioned flush with one of said ruled markings so as to serve as a stop for items being measured by said ruler;
    a battery being positioned within said box and being connected to said light-emitting diode for energizing said light-emitting diode; and,
    a switch being secured to the top of said box for selectively opening and closing the connection between said battery and said light-emitting diode.

* * * * *